US006949276B2

(12) United States Patent
Jain et al.

(10) Patent No.: US 6,949,276 B2
(45) Date of Patent: Sep. 27, 2005

(54) BLADDER SHELL FOR INFLATABLE BALLS

(75) Inventors: Satish Jain, Shakti Nagar Delhi (IN); Naresh Jain, Shakti Nagar Delhi (IN); Anil Jain, Shakti Nagar Delhi (IN); Vipin Jain, Shakti Nagar Delhi (IN); Jinesh Jain, Shakti Nagar Delhi (IN)

(73) Assignees: Enkay (India) Rubber Company, Delhi (IN); Private Limited, Delhi (IN)

( * ) Notice: Subject to any disclaimer, the term of this patent is extended or adjusted under 35 U.S.C. 154(b) by 0 days.

(21) Appl. No.: 10/361,344

(22) Filed: Feb. 10, 2003

(65) Prior Publication Data

US 2003/0175458 A1 Sep. 18, 2003

Related U.S. Application Data

(63) Continuation of application No. 09/422,197, filed on Oct. 19, 1999, now Pat. No. 6,544,608.

(30) Foreign Application Priority Data

Oct. 8, 1999 (IN) ....................................... 1342/DEL/99
Oct. 8, 1999 (IN) ....................................... 1343/DEL/99
Oct. 8, 1999 (IN) ....................................... 1341/DEL/99

(51) Int. Cl.[7] ......................... A63B 41/02; A63B 41/10; B28B 1/38; B32B 25/12

(52) U.S. Cl. .................... 428/36.8; 428/34.1; 428/35.7; 428/36.92; 473/609; 473/610; 473/611; 264/301; 264/347

(58) Field of Search ................................ 264/301, 347; 428/34.1, 35.7, 36.8, 36.92; 473/604, 607, 609, 610, 611

(56) References Cited

U.S. PATENT DOCUMENTS 3,876,405 A * 4/1975 Eilerman ..................... 65/448
3,937,264 A * 2/1976 Mikovits et al. ............. 157/1.1
4,710,541 A 12/1987 Tomita et al. .............. 525/104
4,714,734 A 12/1987 Hashimoto et al. .......... 524/496
5,503,940 A * 4/1996 Majumdar et al. .......... 428/492
5,545,451 A 8/1996 Haung et al. .............. 428/36.8
5,865,697 A * 2/1999 Molitor et al. .............. 473/605
5,992,486 A 11/1999 Katsuki et al. ............. 152/510
6,037,025 A * 3/2000 Matsunaga et al. ...... 428/36.91

FOREIGN PATENT DOCUMENTS

DE 19738906 3/1999
EP 0511681 11/1992
WO 9623643 8/1996

OTHER PUBLICATIONS

Patent Abstract of Japan of JP 11080438 dated Mar. 26, 1999.

English Disclosure Statement of DE 19738906 dated Mar. 11, 1999.

* cited by examiner

*Primary Examiner*—Harold Pyon
*Assistant Examiner*—Walter B Aughenbaugh
(74) *Attorney, Agent, or Firm*—Ladas and Parry LLP

(57) ABSTRACT

A bladder shell for inflatable balls having a layer of blended synthetic latex and natural rubber latex compounded with an anti-oxidant, an activator, an accelerator, a thickening agent, a wetting agent, and a stabilizer etc. to form a low air permeability and high bounce bladder shell having thickness of between 0.25 mm to 3.0 mm. Also disclosed is a process for the preparation of the bladder shell that includes dipping former in a bath of blended natural rubber latex and synthetic latex.

7 Claims, 2 Drawing Sheets

BLADDER SHELL FOR INFLATABLE BALLS

CROSS REFERENCE TO RELATED APPLICATIONS

This application is a continuation of U.S. Ser. No. 09/422, 197, filed Oct. 19, 1999, now U.S. Pat. No. 6,544,608 B1.

FIELD OF THE INVENTION

The subject invention relates to a bladder shell for inflatable balls comprising at least a pair of layers of compounded synthetic latex and compounded natural rubber latex laminated together and crosslinked integrally to each other by vulcanization to form a low air permeability and high bounce bladder shell. The total thickness of the resultant laminated layers is from 0.25 mm to 3.0 mm.

Another embodiment of the invention relates to an improved process for the manufacture of a latex bladder shell for use in inflatable bladder comprising at least a layer of natural rubber latex and synthetic latex each. The main embodiment of the process of the present invention resides in providing lamination of more than one layer of latex to form a bladder with improved properties of air retention as well as bounce characteristics.

The object of the invention is to make a bladder with low air permeability and high bounce properties.

BACKGROUND OF THE INVENTION

The conventionally available bladders in the market either posses low air permeability property or have the high bounce property. There is always a need for the bladders which are having both the low air permeability and high bounce properties.

In the rubber bladders as known conventionally, rubber compounds such as butyl rubber are compounded on a rubber mill or banbury mixer. This compound is then calendered to the desired thickness in sheet form. From the rubber sheet, quarter sections of the bladder are die cut and pieced together by hand with adhesive and end patches. A valve is inserted and adhered to the construction. The total construction is then heat cured to produce a bladder. The adhesive application results in the imperfect seals and poor weight balance. This conventional process often results in high amounts of defective bladders and excess scrap.

The bladders made up of thermoplastic materials such as polyethylene powders and vinyl plastisols are also known conventionally. However, these materials are found to have no bounce but have good air retention and hence found not suitable for inflatable bladders.

The inflatable bladders made up of natural rubber are also available conventionally. The latex rubber bladder shell made from natural rubber latex as available in the market are found to have very good bounce property but have high air permeability properties. Due to high air permeability, the air leaks out frequently leading to frequent refilling of the bladder within short durations.

The bladders made up of butyl rubber are also known conventionally. The bladder composition containing low unsaturated butyl rubber has been disclosed in U.S. Pat. No. 4,022,848. This Patent teaches the use of butyl rubber composition in tire curing bladders, air bags and curing tubes.

Butyl rubber is well known in the art and is disclosed in U.S. Pat. No. 3,031,423, column 1, lines 15 to 24. The problems faced with the butyl rubber bladder is that while it has a good air retention, but it lacks in good bounce properties.

Hence, there is a need to decrease the air permeability without affecting the bounce and other properties.

SUMMARY OF THE INVENTION

The present invention provides a bladder shell for inflatable ball with desired low air permeability and high bounce characteristics. The invention also defines process for preparation of such bladder shells.

The subject invention relates to a bladder shell for inflatable balls comprising at least a pair of layers of compounded synthetic latex and compounded natural rubber latex laminated together and crosslinked integrally to each other by vulcanization to form a low air permeability and high bounce bladder shell and the total thickness of the resultant laminated layers is from 0.25 mm to 3.0 mm.

The invention also relates to a bladder shell for inflatable balls, comprising at least a layer of blended synthetic latex and natural rubber latex blended in the ratio of 80:20 to 20:80 compounded with anti-oxidant, activators, accelerators, thickening and wetting agents, stabilizers etc. to form a low air permeability and high bounce bladder shell, wherein the total thickness of the compounded laminated layers is from 0.25 mm to 3.0 mm.

To achieve the desired results of low air permeability and high bounce properties, the inflatable bladder sheet is processed from the blend of synthetic rubber latex compound and natural rubber latex compound or from laminar dip of more than one compounded lattices.

Latex dipping processes appeared as natural rubber lattices became commercially available in an adequately stable form in the period around 1930s. They followed on as a development of rubber solution dipping as they were less hazardous, more economic and technically more versatile with their high rubber content. Latex dipping process consists of using an inert former, which is in the shape of the ultimately desired product, and this former/ is coated with one or more dips of the latex compound. The coating is set by a coagulant and/or heat dried into a continuous film which can then be stripped from the former.

The conventionally known processes have used natural rubber latex for the preparation of the bladder shell and the former is dipped into a natural rubber latex where coating is set with one or more coagulant dips. The bladder thus formed exhibits high bounce and low air retention properties.

The present invention relates to a process for the preparation of a bladder which exhibits the desired characteristics of high bounce as well as low air permeability. The main embodiment of the present invention resides in the formation of at least a layer of natural rubber latex and a synthetic latex each. The process of the present invention comprises dipping the former in not only a compounded natural rubber latex bath but also in compounded synthetic latex bath. The former is dipped in compounded natural rubber latex bath and compounded synthetic rubber latex alternatively, in any order, thereby forming two different layers of the latex on the former. The end product when stripped has therefore a combination of components present which not only exhibits the desired bounce characteristic but also the required low air permeability properties. More than one layer of the natural rubber latex and the synthetic rubber latex may also be deposited depending upon the characteristics of the end product required.

In an another embodiment, the coagulant coated former is first dipped into a latex dipping tank comprising synthetic rubber latex and other constituents followed by drying, coagulant coating and then dipping into a bath having natural rubber latex along with other constituents or vice versa.

The various ingredients added to the latex i.e. natural rubber latex and/or synthetic rubber latex are selected from the antioxidants, accelerators, activators, stabilizers, softening agents, fillers, waxes, colours, de-webbing agents and non-foaming surfactants.

These ingredients are added into the latex in the form of solutions, dispersions, or emulsions. The ingredients in the form of dispersions and emulsions are added to lattices to form a compound. After preparing the synthetic and natural rubber compounds, the same are transferred to their respective dipping tanks.

To make a blend of natural rubber latex and synthetic rubber latex, the same are mixed in the ratio of 80:20 to 20:80 with the help of stirrer at the rate of 10–15 RPM and passed through a homogenizer to form a homogeneous mixture.

The bladder shell for inflatable balls comprising at least a pair of layers of natural rubber latex and /or synthetic latex are compounded with antioxidant from 0.01 to 3 PHR
accelerators from 1 to 3 PHR
activators from 0.01 to 5 PHR
thickening and wetting agents from 0.5–1 PHR
stabilizers from 0.1–2 PHR and optionally
softeners from 0.1–2 PHR and
fillers from 5–20 PHR The natural rubber lattices are selected from Epoxidised NR latex, Cream latex, Centrifuge latex or double centrifuged latex.

The accelerators are selected from Dithiocarbamate, Vulkacit LDA, Vulkacit LDB, Setsit 9, Setsit 5, Butyl namate, Guanidine, Vulkacit DOTG, Vulkacit D, Mecapto or Thiuram accelerators and the like.

The antioxidants used are non-discolouring type of antioxidant and slight discolouring type of antioxidants. The Non-discolouring type of antioxidants are selected from Antioxidant BKF, Antioxidant NKF, Antioxidant MB, Antioxidant ZMB, Antioxidant NONOX SP, Antioxidant NONOX WSP, Antioxidant NONOX BROD, Antioxidant 2246, Wingstay L or Agerite White and the like.

The slight discolouring type of antioxidants are selected from Antioxidant HS or Antioxidant Nonex BROD and the like.

The optional components as softeners and fillers may also added in the subject composition, where the softeners are selected from the group comprising paraffin, paraffin wax or Stearic acid. The fillers are selected from China Clay, Mica Powder, Whiting, Lithopone, Blancfixe, Carbon Blacks or Titanium Oxide.

All the above referenced ingredients are added into the latex in the form of dispersions, emulsions or solutions in the predetermined ratio.

The inflatable bladder shell is manufactured by dipping the cleaned former into first coagulant bath to obtain a uniform film on the former. The coagulant bath is containing the components selected from the Calcium Nitrate, Calcium Chloride, Acetic acid, parting agents or carriers, water and optionally alcohol, wetting agents and defoaming agents, the former having a layer of coagulant on it is then dried. The coagulant coated former is then dipped into the tank having either a blend of compounded lattices into it or having the synthetic latex compound or natural rubber latex compound.

The latex coated former is then dried in an oven. The former is then dipped into water bath for cooling and thereafter bladder shell thus formed is stripped. The product bladder shell is then washed and dried and subjected to post curing treatment. The valve is then fitted on the neck of the bladder shell to form the bladder for the inflatable ball.

The subject invention can better be understood with reference to accompanying drawings. However, the same should not be construed to restrict the scope of the invention.

DETAILED DESCRIPTION OF THE INVENTION

Figure 1:
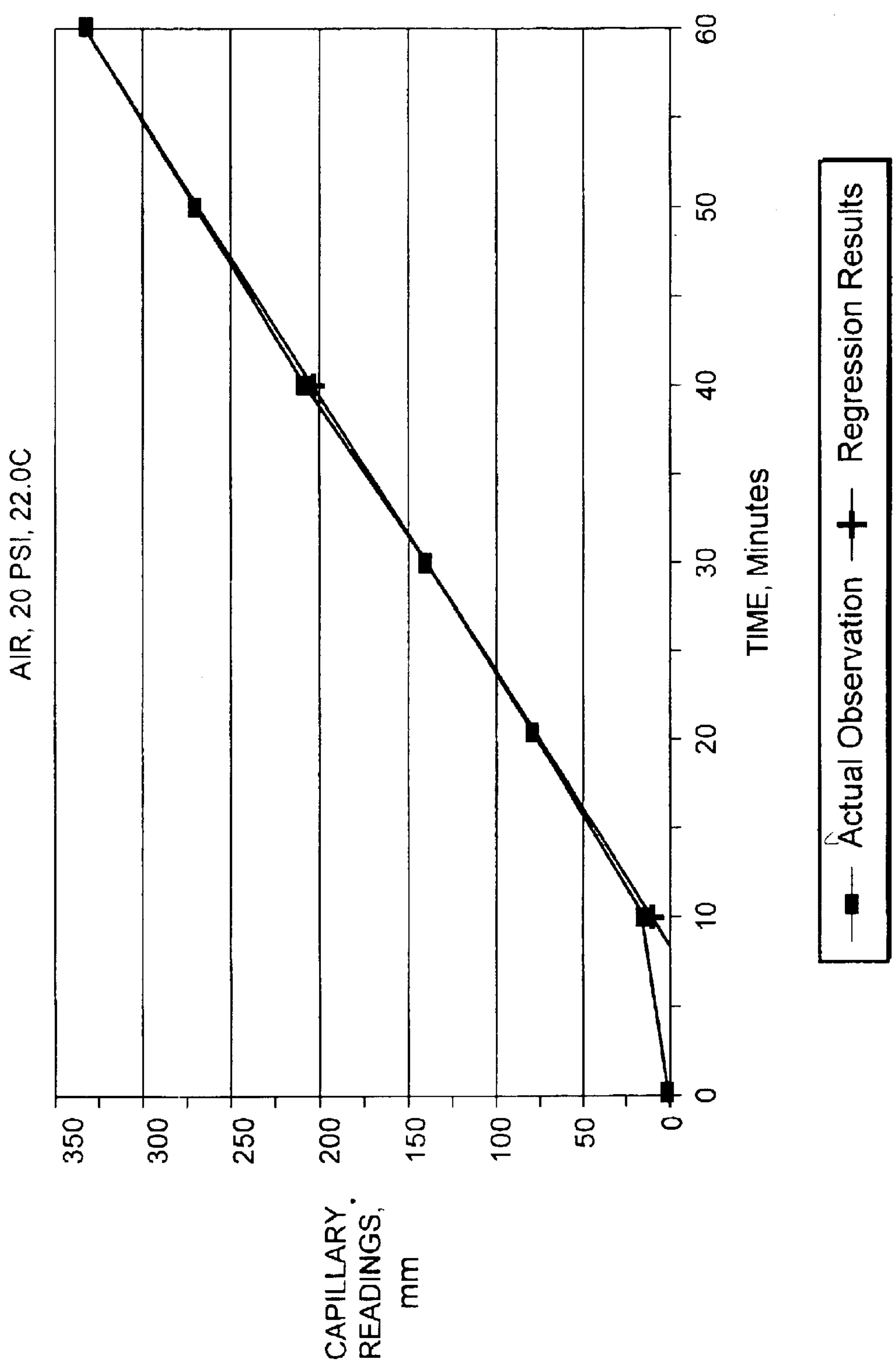
FIG. 1 depicts the regression results of the conventionally available bladder
Figure 2:
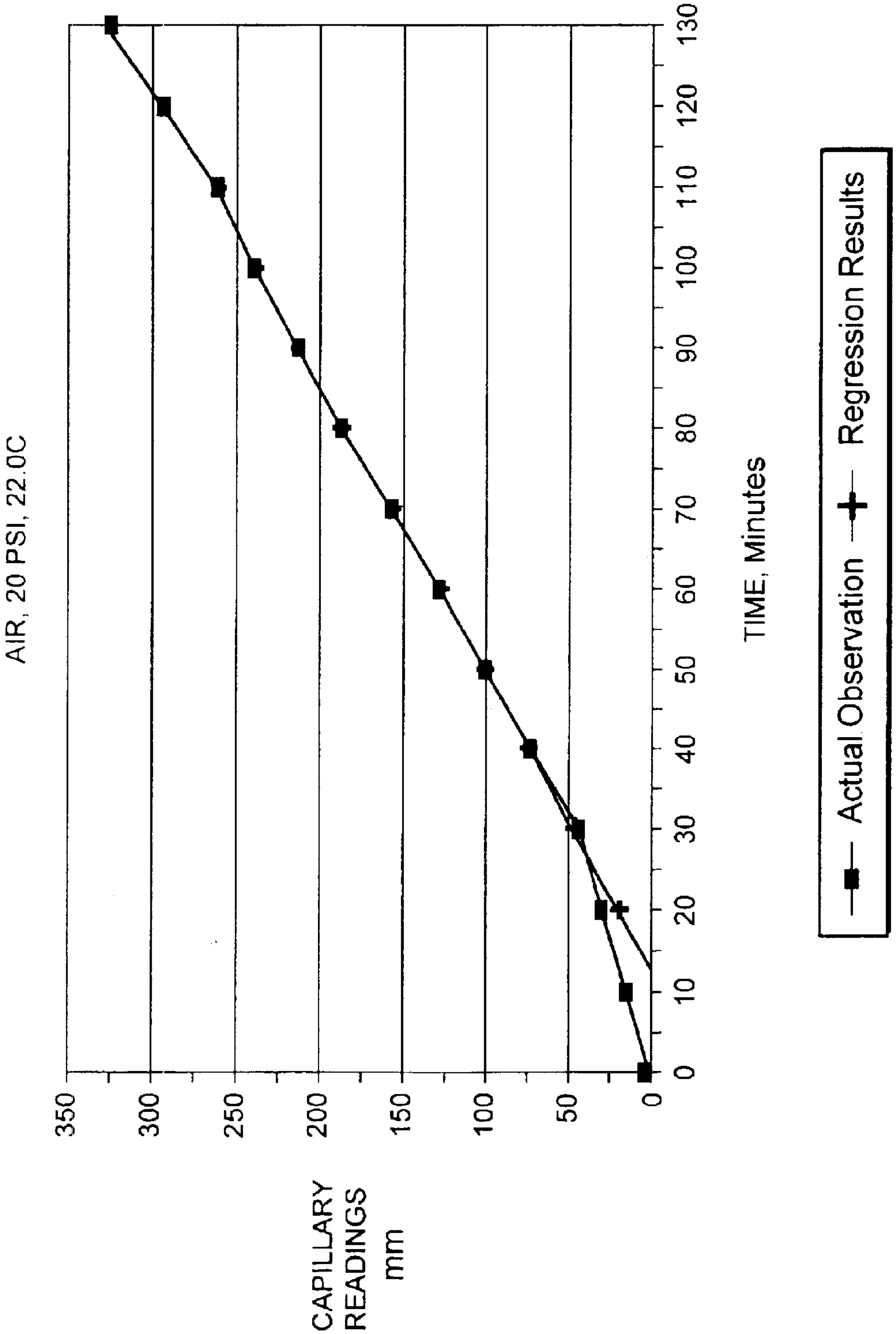
FIG. 2 depicts the regression results of the inflatable bladder of subject invention.

The present invention relates to a bladder shell comprising at least a layer of natural rubber latex and synthetic latex laminated together and crosslinked integrally to each other by vulcanization to form a low air permeability and high bounce bladder shell. The total thickness of the resultant laminated layers is from 0.25 mm to 3.0 mm.

The present invention further defines a bladder shell comprising at least a layer of blended natural rubber latex and synthetic latex blended in the ratio of 80:20 to 20:80 compounded with anti oxidant, activators, accelerators, thickening and wetting agents, stabilisers etc. to form a low air permeability and high bounce bladder shell, wherein the total thickness of the compounded laminated layer is from 0.25 mm to 3.0 mm.

In an another embodiment, the process for the preparation of the bladder shell is defined. For the manufacture of the bladder shell, the formers formed of porcelain, plastic or metals, is first cleaned to remove all dust and all extraneous material. The surface of all formers is preferably cleaned by dipping formers into acids-alkali and/or water. The effective cleaning of the formers may also be ensured by using an ultrasonic cleaning bath. The cleaned formers may also be subjected to washing and conditioning where the formers are dipped into a conditioning bath so that a uniform wetting in the next bath is obtained.

The washed, cleaned and conditioned former is then dipped into a coagulant bath, termed as first coagulant bath to form a uniform film of first coagulant on the former. The coagulant bath comprises a solution of components selected from calcium nitrate, calcium chloride and acetic acid along with the wetting agents, defoaming agents, parting agents or carriers. The calcium chloride and/or calcium nitrate are present in an amount of 10–75% of the total composition. Acetic acid is added in the solution to maintain the acidic pH between 2.2 to 6.8. The wetting agents in the coagulant bath are added in an amount of 0.01 to 10% by weight of the total composition. The wetting agents are basically surface active agents chosen from anionic, non-ionic or cationic surfactants. Alcohol may optionally be used as wetting agent. Parting agents are inert powders added to facilitate the removal of the end product. The viscosity of the coagulant is low which is increased by the addition of an inert powder, thereby enabling formation of a viscous layer of the coagulant on the former. The parting agents, i.e., the inert powders are selected from talcum powder, calcium carbonate, magnesium oxide, bentonite clay and the like inert material. The parting agents are added in an amount of 0.01 to 20%. A uniform coagulant layer is formed on the former where uniformity is ensured due to presence of the wetting agents in the coagulant bath. The thickness of the layer deposited on the former depends on the required thickness of the resultant film required to form the bladder and also on the specifications of the bladder. The temperatures of the first coagulant dip is maintained at between 10–85° C. The first coagulant coated former is then dried at room temperature or by blowing air or by heating. The defoaming agents are also surface active agents.

This dried first coagulant coated former is then dipped in a latex bath which is selected from the natural rubber bath or the synthetic latex bath. At this stage either synthetic latex bath or natural rubber latex bath may be used. If synthetic latex bath is used first, in the next stage, natural rubber latex bath is used.

Synthetic latex bath comprises of synthetic latex compounded with compounding ingredients. The synthetic lattice is selected from the group consisting of Styrene-butadiene latex, Acrylonitrile-butadiene latex, Polychloroprene latex, Butyl latex, and EPDM latex. The synthetic latex is compounded with compounding ingredients selected from vulcanising agent; antioxidants; activators; thickening and/or wetting agents; and optionally softeners and fillers.

The compound for the preparation of subject bladder is prepared by blending the natural rubber latex and synthetic rubber latex in the ratio of 20:80 to 80:20 along with other constituents as antioxidants, accelerators, activators, stabilizers, softening agents, fillers, waxes, colours, de-webbing agents and non-foaming surfactants, at a temperature of 25–35° C.

In the synthetic latex bath, the latex is added as an aqueous solution whereas the other compounds, i.e., vulcanising agent, antioxidants, activators, thickening and/or wetting agents, softeners and fillers are added to the tank in a solution, dispersion or emulsion form. The temperature of the synthetic latex bath is maintained between 20 to 75° C.

The dried first coagulant coated former is dipped in the synthetic latex bath for a time period sufficient to obtain a layer of synthetic latex on the first coagulant film on the former. The thickness of the layer of synthetic latex deposited depends directly on the thickness desired of the end product. The former is dipped in the synthetic latex bath preferably for a period of 0.5 to 15 minutes.

Pursuant to such synthetic latex layer formation on the former, the former with a layer of synthetic latex is dried either in open or closed chambers. Drying in open chambers is carried out by leaving the former in open while drying in closed chambers comprises blowing air or heat. The drying in closed chambers avoid deposition of any extraneous material on the layer of synthetic latex on the former.

The dried former having a layer of synthetic latex is thereafter dipped into a second coagulant bath which comprises a solution of calcium nitrate, calcium chloride and acetic acid to form a film of second coagulant on the layer of synthetic latex on the former. Besides, these components the bath also comprises wetting agents, defoaming agents. The calcium chloride, calcium nitrate and acetic acid are present in an amount of 10–75% of the total composition. The wetting agents in the coagulant bath are added in an amount of 0.01 to 10% by weight of the total composition. The wetting agents are basically surface active agents chosen from anionic, non-ionic or cationic surfactants. Alcohol may also be used as wetting agent. A uniform coagulant layer is formed on the former where uniformity is ensured due to presence of the wetting agents in the coagulant bath. The thickness of the layer deposited on the former depends on the required thickness of the resultant film required to form the bladder and also on the specifications of the bladder. The temperatures of the second coagulant bath is maintained at between 10–85° C.

Pursuant to second coagulant dip the second coagulant coated former is dried in open or closed chambers.

The dried former is thereafter dipped in a natural rubber latex bath where the bath contains the natural rubber latex compounded with vulcanising agent, antioxidants, activators, thickening and/or wetting agents, and optionally softeners and/or fillers. The compounding ingredients are added to the tank in a solution, dispersion or emulsion form. A layer of the natural rubber latex is formed on the second coagulant. The temperature of the natural rubber latex bath is maintained between 20 to 75° C.

The former is dipped in the natural rubber latex bath for a time period sufficient to provide the required thickness of the film. The thickness of the film deposited depends directly on the thickness desired of the end product. The former is dipped in the natural rubber latex bath preferably for a period of 0.5 to 15 minutes.

The former having a layer of natural rubber latex is thereafter dried at room temperature. Thus the former here has two layers, one of the synthetic latex and the other of the natural rubber latex The dried former is then leached by washing in hot water. The films on the former are dipped in hot water for 2–20 minutes to remove the excess compounding ingredients present on the surface. By leaching process the surplus chemicals get washed into hot water.

The washed surfaces of the former are then dried in a drying oven which operate at a temperature 40–110° C. In the drying oven the water present is completely evaporated from the surface of the former.

The former are thereafter passed on for vulcanising in an oven where the temperature is the range of 100–140° C. The hot air is present with no inert medium being present. The chemicals from the surface of the film on the former are completely evaporated at this stage.

The former are then cooled to room temperature preferably in open air or by using flowing water.

The film formed on the former is then stripped. The stripping is either done manually or mechanically and then this film/bladder shell is washed in water at room temperature to remove any extraneous material that might be present on/in film/bladder shell thus formed.

The stripped and washed film is thereafter subjected to post stripping curing through tumblers and hot air room chambers. The post curing is done at a temperature of 60–90° C. for 8–12 hours in a hot air room.

Dipping of the natural rubber bath may be done either before of after dipping in the synthetic latex bath. The film formed on the former may have the layer of either synthetic latex over natural rubber latex or vice versa.

The film thus formed is the seamless body of bladder which is converted to bladder by inserting valve(s) at the end of the bladder. Thus a bladder with required air retention and bounce characteristic property is formed.

The synthetic latex and natural rubber latex compounds are transferred to their respective tanks at a particular temperature, having baffles or agitators into it to avoid the skimming and settling of the various ingredients in the compound.

A comparative study between the existing bladders and the bladder of subject invention shows the clear distinction between the various properties of the two bladders.

| Properties | Bladder of subject invention | Conventional bladder |
|---|---|---|
| Slope | 0.0045 cm/sec | 0.0105 cm/sec |
| Capillary diameter | 0.1 cm | 0.1 cm |
| Capillary cross-sectional area | $\pi(0.1\ cm/2)^2 = 7.854 \times 10^{-3}\ cm^2$ | $\pi 7.854 \times 10^{-3}\ cm^2$ |

A test has been conducted using the conventional bladder having the thickness of 0.1000, at a temperature of 22 degrees and pressure of 20.0, and the bladder of subject invention having the same parameters, to judge the regression results of both the conventionally available bladders and the bladders of subject invention as—

| | Conventional bladder | | Bladder of subject invention | |
|---|---|---|---|---|
| elapsed time | Observation mm | Regression mm | Observation mm | Regression mm |
| 0 | 0.0 | 44.8 | 4.0 | −33.6 |
| 10 | 22.0 | 18.2 | 16.0 | −6.6 |
| 20 | 81.0 | 81.2 | 30.0 | 20.5 |
| 30 | 143.0 | 144.2 | 46.0 | 47.5 |
| 40 | 209.0 | 207.2 | 75.0 | 74.5 |
| 50 | 271.0 | 270.2 | 101.0 | 101.6 |
| 60 | 332.0 | 333.2 | 130.0 | 128.6 |

The regression results of the two bladders are depicted by graphs 1 and 2 respectively.

Experimental data conducted has shown the air permeability in case of subject bladder to be 3.62E-08 as compared to the conventionally available bladders, which is 8.44E-08.

The present invention can be understood explicitly and clearly from the following examples:

EXAMPLE 1

A former of metal is washed to remove all dust and all extraneous material. The surface of the aluminum former is cleaned by dipping it into acids-alkali followed by washing with water. The washed and cleaned former is then dipped in a first coagulant bath. The first coagulant bath comprises a solution of calcium nitrate and calcium chloride in an amount of 55% and 0.05% by weight of the total composition of wetting agent; 0.07% talcum powder and the rest being water. The temperatures of the first coagulant dip is maintained at about 50° C. After the former is removed from the coagulant bath, it is dried at room temperature and dipped in a nitrile latex bath comprising 45% aqueous nitrile latex; 1.5% sulfur and dithiocarbamates; 2% by weight of Antioxidant BKF; 4% by weight of zinc oxide; 1.5% of thickening and/or wetting agents; 1% liquid paraffin and upto 1% china clay. The temperature of the synthetic latex dip is maintained at 30° C. The former is dipped in the synthetic latex bath for a period of 1 minute. Pursuant to such synthetic latex film formation on the former, it is dried at room temperature. The dried former is thereafter dipped in a second coagulant bath comprising 60% solution of calcium chloride, 5% anioinc surfactants, defoaming agents and alcohol at a temperature of 50° C. The former is thereafter dried and dipped in the natural rubber latex bath. The natural rubber latex bath contains the natural rubber latex along with sulfur and zinc oxide active and Antioxidant, wetting agent, softeners and fillers. The temperature of the natural rubber latex bath is 55° C. The former is dipped in the natural rubber latex bath preferably for a period of 2 minutes. The former is thereafter dried at room temperature. The dried former is then leached by washing in hot water. The films on the former are dipped in hot water for 10 minutes to remove extraneous chemicals present on the surface. The leached former is then dried in a drying oven which operates at a temperature 55° C. The former is thereafter passed on to oven where the temperature is maintained at about 90° C. where hot air is present with no inert medium being present. The former are then cooled to room temperature in open air. The film formed on the former is then manually stripped and water is added into the stripped film at room temperature to remove any extraneous material that might be present on the sides of the film thus formed. The stripped and washed film is thereafter subjected to post stripping curing through tumblers and hot air room chambers. The post curing is done at a temperature of 70° C. for about 8 hours in a hot air room.

EXAMPLE 2

A bladder shell for inflatable balls comprising a layer of synthetic latex and natural rubber latex, laminated together and cross linked integrally to each other by vulcanisation to form a low air permeability and high bounce bladder shell having a thickness of 0.8 mm.

EXAMPLE 3

A bladder shell for inflatable balls having low air permeability and high bounce characteristics comprising a layer of blended natural rubber latex and synthetic latex having a thickness of 1.2 mm.

The subject invention as described herein should not be construed to restrict the broad scope of the invention.

We claim:

1. An article consisting of a single layer of synthetic latex blended with a natural rubber latex and compounded with ingredients comprising an anti-oxidant, an activator, an accelerator, a thickening agent, a wetting agent, and a stabilizer, said single layer being in a form such that it is disposable in a ball as an inflatable bladder shell that, when inflated, retains air and imparts bounce characteristics to the ball, the synthetic latex being blended with the natural rubber latex so as to impart to the single layer a reduced permeability to air as compared with a layer consisting of the natural rubber latex alone, the natural rubber latex and synthetic latex being present in the single layer in a ratio of 80:20 to 20:80; the thickness of the bladder shell being between 0.25 to 3.0 mm.

2. A bladder shell comprising a valve and an article consisting of a single layer of synthetic latex blended with a natural rubber latex and compound with ingredients comprising an anti-oxidant, an activator, an accelerator, a thickening agent, a wetting agent, and a stabilizer, said single layer being in a form such that it is disposable in a ball as an inflatable bladder shell that, when inflated, retains air and impacts bounce characteristics to the ball, the synthetic latex being blended with the natural rubber latex so as to impart to the single layer a reduced permeability to air as compared with a layer consisting of the natural rubber latex alone, the natural rubber latex and synthetic latex being present in the single layer in a ratio of 80:20 to 20:80; the thickness of the bladder shell being between 0.25 to 3.0 mm, wherein the valve is in the single layer.

3. A ball comprising a bladder shell comprising a valve and an article consisting of a single layer of synthetic latex blended with a natural rubber latex and compounded with ingredients comprising an anti-oxidant, an activator, an accelerator, a thickening agent, a wetting agent, and a stabilizer, said single layer being in a form such that it is disposable in a ball as an inflatable bladder shell that, when inflated, retains air and imparts bounce characteristics to the ball, the synthetic latex being blended with the natural rubber latex so as to impart to the single layer a reduced permeability to air as compared with a layer consisting of the natural rubber latex alone, the natural rubber latex and synthetic latex being present in the single layer in a ratio of 80:20 to 20:80; the thickness of the bladder shell being between 0.25 to 3.0 mm, wherein the valve is in the single layer.

4. The bladder shell as claimed in claim 2, wherein the synthetic latex is selected from the group consisting of acrylonitrile-butadiene latex and polychloroprene latex.

5. The ball as claimed in claim 3, wherein the blend of natural latex and the synthetic latex is compounded with antioxidant from 0.01 to 3 PHR;

accelerator from 1 to 3 PHR;

activator from 0.01 to 5 PHR;

thickening and wetting agents combined from 0.5–1 PHR;

stabilizer from 0.1–2 PHR; and optionally softener from 0.1–2 PHR; and filler from 5–20 PHR.

6. The ball as claimed in claim 5, wherein the softener is selected from the group consisting of anionic paraffin, and paraffin wax, and the activator is selected from the group consisting of stearic acid, zinc oxide, activated zinc and mixtures thereof.

7. A process of manufacture of an article consisting of a single layer of synthetic latex blended with a natural rubber latex and compounded with ingredients comprising an anti-oxidant, an activator, an accelerator, a thickening agent, a wetting agent, and a stabilizer, said single layer being in a form such that it is disposable in a ball as inflatable bladder shell that, when inflated, retains air and imparts bounce characteristics to the ball, the synthetic latex being blended with the natural rubber latex so as to impart to the single layer a reduced permeability to air as compared with a layer consisting of the natural rubber latex alone, the natural rubber latex and synthetic latex being present in the single layer in a ratio of 80:20 to 20:80; the thickness of the bladder shell being between 0.25 to 3.0 mm, comprising the steps of:

a) cleaning a former;

b) dipping the cleaned former into a first coagulant bath at a temperature of 10–85° C. to obtain a first coagulant coated former;

c) drying the first coagulant coated former at a temperature of 20–70 degrees C;

d) dipping the dried coagulant coated former into a bath comprising a blend of synthetic latex and natural rubber latex that is compounded with a bath of compounding ingredients having 50–58%. by weight water for a period of 1 to 4 minutes at a temperature of 20–45° C. to obtain a layer of blended natural rubber latex and synthetic latex on the former;

e) drying the former with the layer of said blended natural rubber latex and synthetic latex;

f) leaching the former with the layer of blended natural rubber latex and synthetic latex compound in hot water for 8–10 minutes to remove compounded ingredients from the surface and drying the former in an oven at a temperature of 55–115° C.;

g) vulcanizing the leached former in an oven to form a resultant former having a blended layer of compounded natural rubber latex and synthetic latex at temperature of 100–140 degrees C. in hot air and heating in a drying oven for 25–45 minutes at a temperature of 70 to 90 degrees C.;

h) cooling the resultant former;

i) stripping the layer of blended natural rubber latex synthetic latex off the resultant former to obtain a bladder shell for an inflatable ball;

j) washing the stripped shell with water to remove extraneous material, drying the washed shell in a hot air room and post curing the washed shell at 60–90 degrees C. for 8 to 12 hours.

* * * * *

UNITED STATES PATENT AND TRADEMARK OFFICE

CERTIFICATE OF CORRECTION

PATENT NO. : 6,949,276 B2
DATED : September 27, 2005
INVENTOR(S) : Satish Jain et al.

It is certified that error appears in the above-identified patent and that said Letters Patent is hereby corrected as shown below:

Title page,
Item [73], Assignee, delete ", Delhi (IN);" and after "Limited" insert -- (an Indian Company) --.

Signed and Sealed this

Thirtieth Day of May, 2006

JON W. DUDAS
*Director of the United States Patent and Trademark Office*